United States Patent [19]

Yamada et al.

[11] 4,091,508

[45] May 30, 1978

[54] TONGUE PLATE DEVICE FOR USE IN SEAT BELT SYSTEM

[75] Inventors: Makoto Yamada, Seto; Eiichi Kinaga, Toyota, both of Japan

[73] Assignee: Toyota Jidosha Kogyo Kabushiki Kaisha, Toyota, Japan

[21] Appl. No.: 637,474

[22] Filed: Dec. 3, 1975

[30] Foreign Application Priority Data

Jul. 30, 1975 Japan .................................. 50-92879

[51] Int. Cl.² ........................................... A44B 11/06
[52] U.S. Cl. ..................................... 24/171; 24/77 R; 297/389; 280/747
[58] Field of Search ............... 24/171, 194, 77 R, 196; 297/389; 280/747

[56] References Cited

U.S. PATENT DOCUMENTS

| | | | |
|---|---|---|---|
| 706,080 | 8/1902 | Mitchell | 24/171 |
| 946,917 | 1/1910 | Hubbard | 24/194 |
| 1,796,336 | 3/1931 | Merzinger | 24/194 |
| 2,028,530 | 1/1936 | Steiner | 24/194 |
| 2,938,254 | 5/1960 | Gaylord | 24/171 |
| 3,628,221 | 12/1971 | Pasbrig | 24/194 |
| 3,888,541 | 6/1975 | Stephenson | 297/389 |
| 3,928,895 | 12/1975 | Klink | 24/196 |
| 3,974,546 | 8/1976 | Walker | 24/196 |
| 3,975,800 | 8/1976 | Farlind | 24/196 |
| 3,981,535 | 9/1976 | Henderson | 297/389 |

FOREIGN PATENT DOCUMENTS

| | | | |
|---|---|---|---|
| 351,554 | 4/1922 | Germany | 24/171 |
| 653,832 | 5/1951 | United Kingdom | 24/194 |
| 674,631 | 6/1952 | United Kingdom | 24/194 |
| 1,189,214 | 4/1970 | United Kingdom | 24/194 |

Primary Examiner—Bernard A. Gelak
Attorney, Agent, or Firm—Koda and Androlia

[57] ABSTRACT

A tongue plate device for use in a seat belt system of the kind using a continuous webbing consisting of a lap portion and a shoulder portion for restraining an occupant onto a seat of a vehicle. The tongue plate device can be easily slipped on the webbing when the occupant fasten the seat belt and locked in any desired position on the webbing by simple manipulation by the occupant so as to restrain the occupant onto the seat without giving a sense of oppression while ensuring improved restraining effect for the occupant in an emergency.

8 Claims, 11 Drawing Figures

TONGUE PLATE DEVICE FOR USE IN SEAT BELT SYSTEM

BACKGROUND OF THE INVENTION

1. Field of the Invention

This invention relates to tongue plate devices for use in seat belts provided in a vehicle for restraining occupants to seats of the vehicle to ensure the restraining effect to the occupants in an emergency, and more particularly to a tongue plate device for use in a seat belt system of a kind using a continuous webbing consisting of a lap belt and a shoulder belt.

2. Description of the Prior Art

A three-point type safety seat belt system using a continuous webbing consisting of a lap portion and a shoulder portion is recently widely employed in vehicles.

A typical form of prior art tongue plate devices widely employed in the seat belt systems of this kind is generally constituted by a single member which is provided at one end thereof with an opening adapted to be engaged by a buckle and at the other end thereof with another opening adapted to permit passage of the continuous webbing therethrough.

The structure of the prior art tongue plate device has been such that the webbing passing opening provides a resistance against the webbing passing therethrough and this resistance is utilized to bear the force opposing to the retracting force of the seat belt retractor and to prevent impartation of a tension to a part of the webbing passed already to the other side of the webbing passing opening thereby eliminating impartation of a sense of oppression to the occupant wearing the seat belt on his body.

However, due to the fact that such a resistance is not great enough to completely lock the webbing against passing movement through the webbing passing opening of the tongue plate device, an undesirable situation has been frequently given rise to in which the tongue plate device is displaced from the proper set position on the webbing during the use of the seat belt system or during the retracting movement of the webbing into the retractor or the seat belt is not properly fitted on the body of the occupant. Occurrence of such situation has resulted in an undesirable reduction of the effect of sufficiently restraining the wearer to the seat of the vehicle to ensure the safety of the wearer in case of emergency.

Further, the prior art tongue plate device constructed to provide such resistance has been defective in that this resistance provides an adverse effect of giving the occupant extreme inconvenience when he wears the seat belt on his body and when he tries to adjust the length of the seat belt.

SUMMARY OF THE INVENTION

It is an object of the present invention to provide a novel and improved tongue plate device for use in a seat belt system of the kind above described, which can releasably lock a webbing against passing through a webbing passing opening of a tongue plate by the retraction force of the retractor in spite of simple construction.

Another object of the present invention is to provide a tongue plate device of the above character, in which the webbing can be permitted or inhibited to pass through the webbing passing opening of the tongue plate by simple manipulation, and therefore, the length of the seat belt can be easily adjusted.

Still another object of the present invention is to provide a tongue plate device of the above character, in which the effective length of the seat belt can be easily adjusted by simple manipulation thereby contributing to the elevation of the use of the seat belt system.

A further object of the present invention is to provide a tongue plate device of the above character, in which the sense of oppression imparted to the seat belt wearer by the retracting force of the belt retractor can be eliminated so that the wearer can be substantially freed from the sense of wearing the seat belt on his body.

The present invention provides a tongue plate device for use in a seat belt system of the kind using a continuous webbing consisting of a lap portion and a shoulder portion, which comprises a tongue plate, a locking plate, spring means and releasing means. The tongue plate is provided at one end threof with a buckle engaging portion and at the other end thereof with a webbing passage portion, the locking plate acts to lock the webbing against passing through this webbing passage portion, this locking plate being normally urged in the locking direction by the spring means, and the releasing means acts to urge the locking plate in the releasing direction to unlock the webbing from the state locked by the locking plate, whereby the webbing can be permitted or inhibited to pass through the webbing passage portion of the tongue plate by simple manipulation.

BRIEF DESCRIPTION OF THE DRAWING

Preferred embodiments of the tongue plate device according to the present invention will be described in detail with reference to the accompanying drawing.

DESCRIPTION OF THE PREFERRED EMBODIMENTS

A preferred embodiment of the tongue plate device of the present invention for use in a seat belt system of the kind using a continuous webbing consisting of a lap belt and a shoulder belt will be described in detail with reference to FIGS. 1 to 3.

Figure 1:
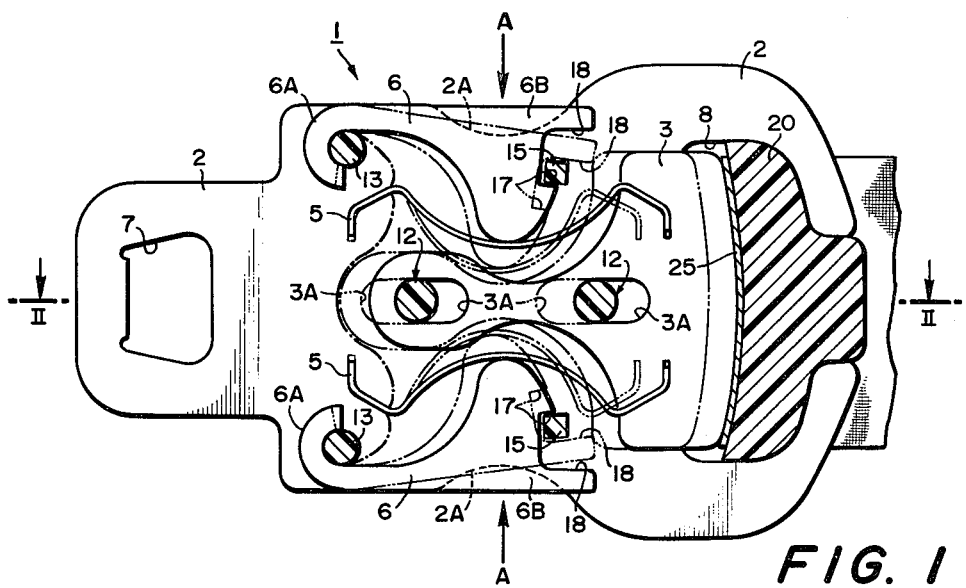
FIG. 1 is a partly sectional front elevation of a first embodiment of the tongue plate device according to the present invention.
Figure 2:
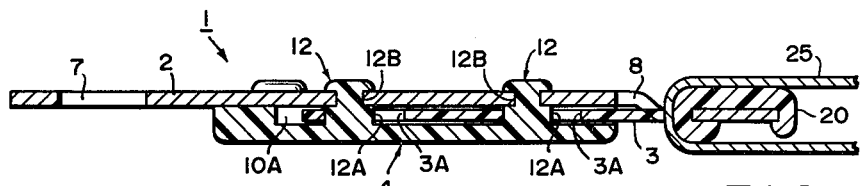
FIG. 2 is a sectional view taken along the line II — II in FIG. 1.
Figure 3:
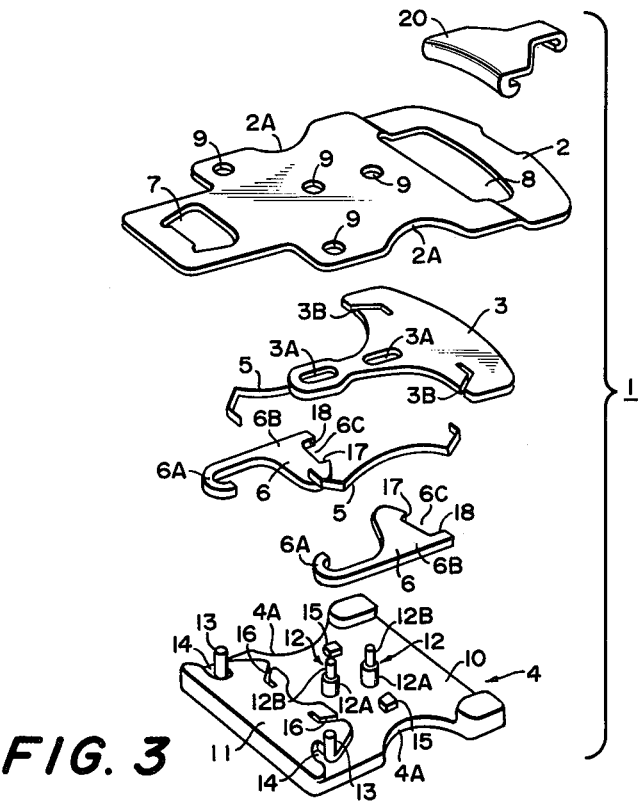
FIG. 3 is an exploded perspective view of the device shown in FIG. 1.

Referring to FIGS. 1 to 3, the tongue plate device embodying the first form of the present invention is generally designated by the reference numeral 1 and comprises a tongue plate 2 in the form of a thin plate of metal, a substantially fan-shaped locking plate 3 having a thickness equivalent to that of the tongue plate 2, a cover member 4 securely fixed to the tongue plate 2 to hold the locking plate 3 between it and the tongue plate 2, a pair of leaf springs 5 anchored at one end thereof to the locking plate 3 and at the other end thereof to the cover member 4 for normally urging the locking plate 3 in a locking direction, and a pair of release levers 6 disposed between the tongue plate 2 and the cover member 4 to permit movement of the locking plate 3 in a releasing direction when manipulated.

The tongue plate 2 of thin metal plate form is substantially rectangular in shape and is provided at one end thereof with an opening 7 for engagement with a buckle of a seat belt system and at the other end thereof with another opening 8 of approximately rectangular shape which is sized to permit passage of a continuous webbing of the seat belt system. Further, four spaced apertures 9 of circular shape are bored in the middle portion of the tongue plate 2 so that the tongue plate 2 can be securely fixed to the cover member 4 in a manner as described hereinafter.

The cover member 4 is integrally moulded from a suitable resin material and has on one surface thereof a flat base surface portion 10 and a raised surface portion 11. The locking plate 3 is adapted to make sliding movement on the flat base surface portion 10 of the cover member 4, and the raised surface portion 11 of the cover member 4 makes face-to-face contact with the corresponding surface portion of the tongue plate 2. A pair of spaced pins 12 extend from the flat base surface portion 10 of the cover member 4 to be inserted into the corresponding apertures 9 of the tongue plate 2, and another pair of spaced pins 13 extend from the raised surface portion 11 of the cover member 4 to be similarly inserted into the corresponding apertures 9 of the tongue plate 2. After being inserted into the apertures 9 of the tongue plate 2, these pins 12 and 13 are caulked at their head portion to securely fix the cover member 4 to the tongue plate 2 while defining therebetween a space 10A in which the locking plate 3 can make sliding movement. The base portion 12A of the pins 12 has a diameter larger than that of the head portion 12B.

A pair of substantially sectoral recesses 14 are formed in the raised surface portion 11 of the cover member 4 adjacent to the respective pins 13. The release levers 6 are arranged to make swinging movement around one end designated by the reference numeral 6A, and these ends 6A are received in the respective recesses 14 of the raised surface portion 11 of the cover member 4. A pair of spaced stoppers 15 are provided on the flat base surface portion 10 of the cover member 4 adjacent to the respective pins 12. These stoppers 15 act to control the sliding movement of the locking plate 3.

A pair of substantially L-shaped grooves 16 are formed in the edge of the raised surface portion 11 confronting the flat base surface portion 10 of the cover member 4 so as to receive therein one end of the respective leaf springs 5.

The locking plate 3 is provided with a pair of spaced slots 3A which are aligned in the moving direction of the locking plate 3. The pins 12 extending from the cover member 4 are loosely fitted at their base portion 12A in these slots 3A so that the locking plate 3 can make sliding movement in the space 10A over the stroke limited by the length of the slots 3A. A pair of substantially L-shaped grooves 3B similar to the grooves 16 in the cover member 4 are formed in the locking plate 3 so as to receive therein the other end of the respective leaf springs 5.

The pivotal end 6A of each of the release levers 6 is arcuate in shape or in hook-like form. These release levers 6 are shaped at the body portion 6B thereof such that, when the release levers 6 are disposed between the tongue plate 2 and the cover member 4, the outer sides thereof protrude beyond a pair of arcuate cutouts 2A formed in the opposite sides of the middle portion of the tongue plate 2 and beyond a pair of similar cutouts 4A formed in the cover member 4 in registered relation with the cutouts 2A, as shown in FIG. 1.

Each of the release levers 6 is engaged at the inner side of the body portion 6B thereof by the associated leaf spring 5 so that these release levers 6 are normally urged to swing away from each other. The body portion 6B of each release lever 6 is formed with a cutout 6C which is engaged by the associated stopper 15. Thus, the release levers 6 are allowed to swing away from each other until one end 17 of the cutout 6C of each lever 6 is engaged by the associated stopper 15 and toward each other until the other end 18 of the cutout 6C of each lever 6 is engaged by the associated stopper 15.

An edge protector 20 of resin material may be fitted in the opening 8 of the tongue plate 2 as required so as to prevent damage to the webbing passing through this opening 8.

The operation of the first embodiment of the present invention will be described with reference to FIG. 1.

The solid lines in FIG. 1 show the positions of the individual elements when a continuous webbing 25 is locked against movement by the tongue plate device. The leaf springs 5 are flexed to engage at their middle portion with the body portion 6B of the release levers 6 to urge these release levers 6 away from each other by the resilient tendency of the springs to return to the original non-flexed state, and at the same time, these leaf springs 5 urge the locking plate 3 toward the edge protector 20 by the ends received in the respective grooves 3B of the locking plate 3. Therefore, the locking plate 3 presses the webbing 25 passing through the opening 8 against the edge protector 20 thereby locking this portion of the webbing 25 against passing movement. Then, when the release levers 6 are manipulated to urge the body portions 6B thereof toward each other, that is, in directions shown by the arrows A, the leaf springs 5 engaging with the release levers 6 are subjected to more flexture as shown by the two-dot chain lines, and the ends of the leaf springs 5 received in the respective grooves 3B of the locking plate 3 act to urge the locking plate 3 away from the edge protector 20. As a result, the webbing 25 can now pass freely through the opening 8 of the tongue plate 2, and the tongue plate device is placed in the webbing releasing mode.

The tongue plate device shown in FIG. 1 can be used in a manner as described with reference to FIG. 4 or 5.

Figure 4:
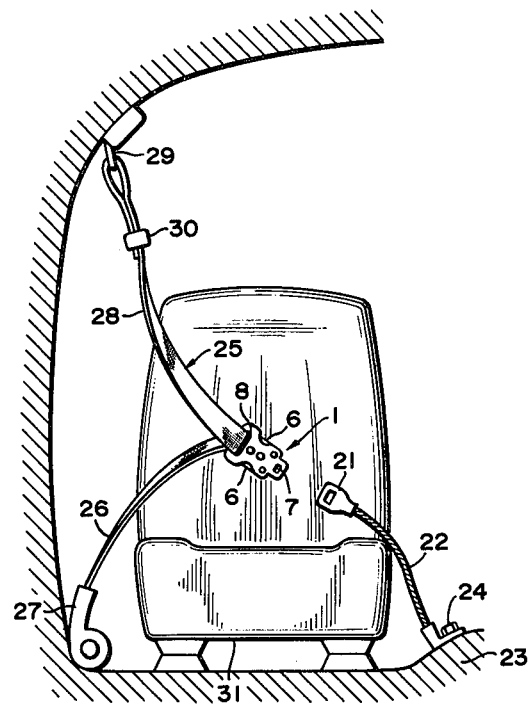
FIGS. 4 and 5 show applications of the tongue plate device to a seat belt system.

In a seat belt system shown in FIG. 4, a buckle 21 is connected to one end of a strap 22 which is firmly fixed at the other end thereof to a vehicle body 23 by a bolt 24. The end portion of a lap belt 26 of a continuous webbing 25 is received in a non-locking retractor 27 firmly fixed to the vehicle body 23, and the end portion of a shoulder belt 28 of the continuous webbing 25 is fixed in a length adjuster 30 after passing through an anchor 29 firmly fixed to the vehicle body 23. Thus, the effective length of the continuous webbing 25 can be changed or adjusted as desired by changing the position of the length adjustor 30.

The intermediate portion of the continuous webbing 25 is passed through the webbing passing opening 8 of the tongue plate 2 in the tongue plate device 1, and the tongue plate 2 is engaged at the engaging opening 7 thereof by the buckle 21. Thus, the continuous webbing 25 and the buckle 21 constitute a three-point seat belt system. In this seat belt system, the non-lock retractor 27 has the sole function of urging the webbing 25 in the retracting direction. Therefore, after an occupant sits on a seat 31 and engages the buckle 21 with the engaging opening 7 of the tongue plate 2 in the tongue plate device 1, he must pull out fully the webbing 25 from the retractor 27 and adjust the position of the length adjuster 30 in such a state in order that the body restraining function of the seat belt system can be sufficiently exhibited.

According to prior art arrangement of this kind, it has been necessary to adjust the length of the webbing 25 while fully pulling out the webbing 25 from the retractor 27, since the webbing 25 is always urged toward the retractor 27 by the retracting force of the retractor 27 and this force is imparted also to the shoulder belt 28 of the webbing 25. It has therefore been difficult to properly adjust the length of the webbing 25.

However, in the above-mentioned embodiment of the tongue plate device according to the present invention, the occupant manipulates the release levers 6 in the tongue plate device 1 after he sits on the seat 31 and engages the tongue plate device 1 with the buckle 21. Thus, the locking force imparted by the locking plate 3 to the webbing 25 in the opening 8 of the tongue plate 2 in the tongue plate device 1 is released due to impartation of the manipulating pressure to the release levers 6, and the webbing 25 can be fully pulled out from the retractor 27 toward the shoulder belt side through the opening 8 of the tongue plate 2. Impartation of the releasing pressure to the release levers 6 is then ceased in such a state so as to lock the webbing 25 in the opening 8 of the tongue plate 2. Due to the locking of the webbing 25 in the opening 8 of the tongue plate 2, no retracting force by the retractor 27 is imparted to the shoulder belt 28 of the webbing 25, and therefore, the effective length of the webbing 25 can now be freely adjusted by the length adjuster 30.

It will thus be seen that the effective length of the webbing 25 is determined already when a specific occupant sits on the seat 31 and wears the seat belt on his body, and the position of the tongue plate device 1 relative to the webbing 25 is fixed against any change. Therefore, when this specific occupant gets on the vehicle again after getting off once and wears the seat belt on his body again, the seat belt fits on his body well without requiring any adjustment. Further, due to the fact that no retracting force by the retractor 27 is imparted to the shoulder belt 28 of the webbing 25, the wearer is free from any sense of oppression imparted by the shoulder belt 28 of the webbing 25. Furthermore, even when another occupant of different physical constitution sits on the same seat, similar manipulation may be made so as to easily change the effective length of the webbing 25.

Figure 5:
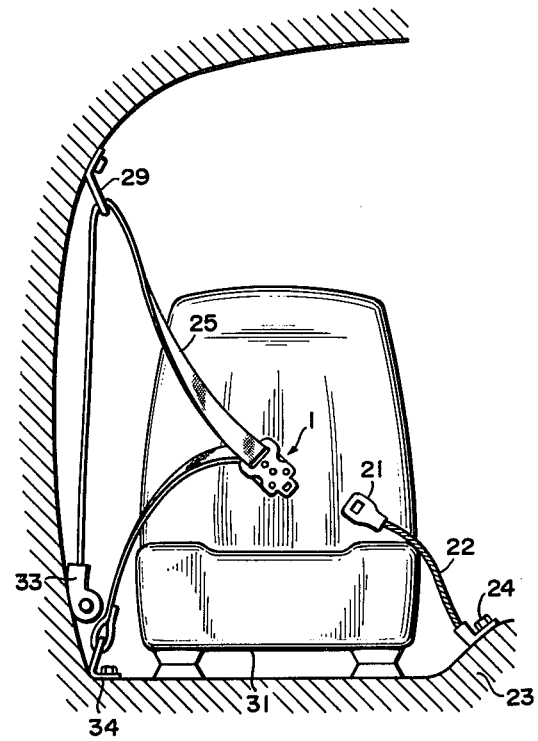

FIG. 5 shows a modification of the seat belt system shown in FIG. 4. In FIG. 5, arrangement is made so that the retracting force by the retractor may not be imparted to the lap belt 26 of the continuous webbing 25. Referring to FIG. 5, one end portion of the webbing 25 is received in an emergency-locking retractor 33 which is constructed to lock the webbing 25 against pull-out sensing an excessive pull-out rate of the webbing 25 relative to vehicle or sensing deceleration of the vehicle. The webbing 25 pulled out from the retractor 33 passes through the shoulder-side anchor 29 and the tongue plate device 1 to be firmly fixed at the other end thereof to a lap-side anchor 34.

In the seat belt system shown in FIG. 5, the webbing 25 can be freely pulled out from the retractor 33 in the normal running state of the vehicle, and therefore, the wearer can freely move the upper part of his body during driving. In this case too, the length of the lap portion of the webbing can be freely adjusted by suitably locking and releasing the webbing 25 by the tongue plate device 1, and the adjusted length of the lap portion of the webbing 25 can be maintained in that value. Therefore, the wearer is freed from the sense of restraining by the lap webbing and the wearing percentage of the seat belt can be improved.

Figure 6:
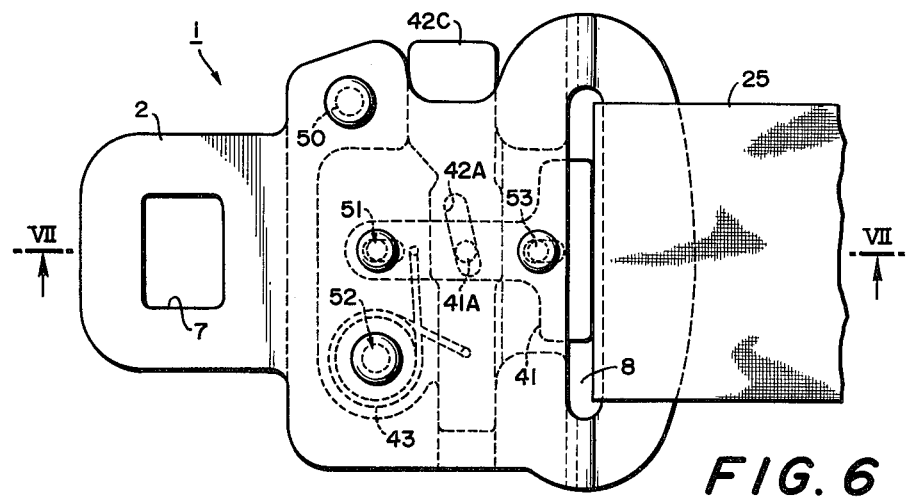
FIG. 6 is a front elevational view of a second embodiment of the present invention.
Figure 7:
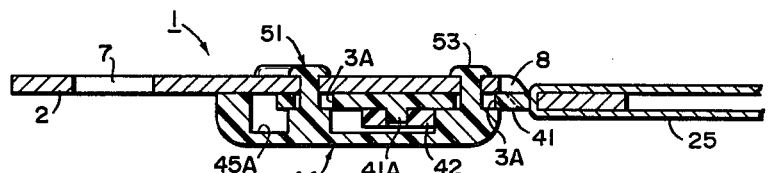
FIG. 7 is a sectional view taken along the line VII — VII in FIG. 6.
Figure 8:
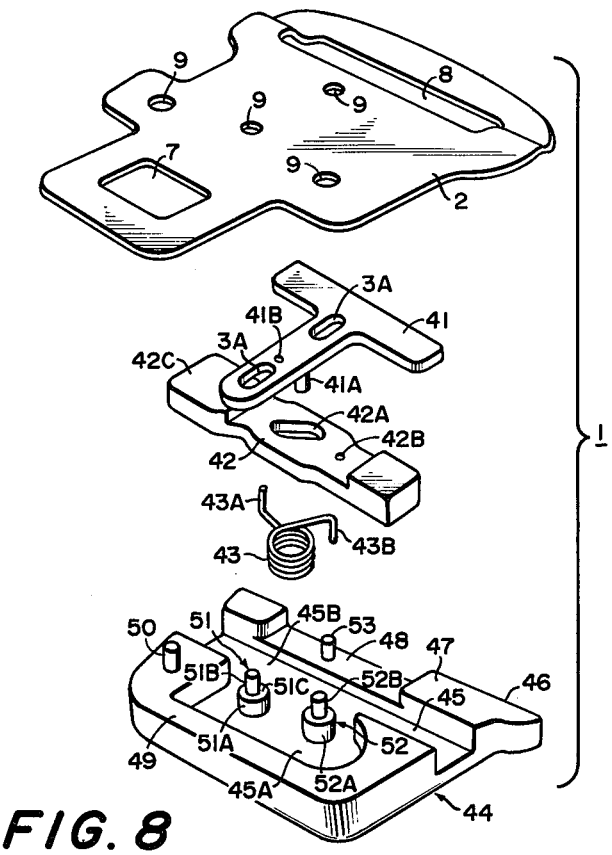
FIG. 8 is an exploded perspective view of the device shown in FIG. 6.

FIGS. 6 to 8 show a second embodiment of the present invention. The tongue plate device 1 embodying the second form of the present invention comprises a tongue plate 2 of shape and material similar to those of the tongue plate 2 employed in the first embodiment, a substantially T-shaped locking plate 41 having a thickness equivalent to that of the tongue plate 2 and adapted to move in the same direction as that of the locking plate 3 employed in the first embodiment, a push rod 42 adapted to move in a direction normal to the moving direction of the locking plate 41 thereby causing movement of the locking plate 41 between a locking position and a releasing position, a torsion coil spring 43 anchored at one end thereof to the push rod 42 and at the other end thereof to the locking plate 41 for normally urging the locking plate 41 in the locking direction, and a cover member 44 securely fixed to the tongue plate 2 to hold the locking plate 41 and push rod 42 between it and the tongue plate 2.

The cover member 44 is integrally moulded from a suitable resin material and is formed at substantially the middle portion of one surface thereof with a groove 45 along which the push rod 42 makes sliding movement. One end edge 46 of this cover member 44 registers with the inner edge of a webbing passing opening 8 of the tongue plate 2 when the cover member 44 is firmly fixed to the tongue plate 2 in a manner as described hereinafter. The cover member 44 is provided with a raised surface portion 47 between the end edge 46 above described and the groove 45, and a recess 48 of depth shallower than that of the groove 45 is formed in the middle of the raised surface portion 47 to provide a sliding path for the locking plate 41.

The cover member 44 is further provided with another raised surface portion 49 opposite to the raised surface portion 47 with the groove 45 interposed therebetween, and the middle portion of the groove 45 extends into the raised surface portion 49 to provide a flat bottomed surface portion 45A which is a continuous extension of the groove 45. A pin 50, pins 51, 52 and another pin 53 project from the raised surface portion 49, flat-bottomed surface portion 45A and recess 48 respectively of the cover member 44 as seen in FIG. 8. These pins 50, 51, 52 and 53 are inserted into corresponding apertures 9 of the tongue plate 2 and are then caulked at the head portion thereof to firmly fix the cover member 44 to the tongue plate 2.

The base portion 51A of the pin 51 has a diameter larger than that of the head portion 51B, and the height of the stepped portion 51C of the pin 51 is selected to be the same as that of the recess 48 of the cover member 44. Thus, this stepped portion 51C of the pin 51 cooperates with the recess 48 of the cover member 44 to provide a sliding path for the locking plate 41. The base portion 52A of the pin 52 has a diameter larger than that of the head portion 52B, and the coil spring 43 is loosely mounted on this base portion 52A of the pin 52.

A pair of aligned slots 3A are bored in the locking plate 41 to loosely receive therein the pin 53 and head portion 51B of pin 51 respectively. A pin 41A projects from the portion of the locking plate 41 intermediate between these slots 3A, and this pin 41A is inserted into a slot 42A bored in the middle portion of the push rod 42. The longitudinal direction of this slot 42A makes a predetermined angle with the moving direction of the push rod 42 so that the slot 42A acts as a cam means. Thus, the locking plate 41 can be moved in the direction normal to the moving direction of the push rod 42 when the push rod 42 slides along the groove 45 of the cover member 44.

The ends 43A and 43B of the coil spring 43 loosely mounted on the large-diameter base portion 52A of the pin 52 projecting from the cover member 44 are received in small apertures 41B and 42B bored in the locking plate 41 and push rod 42 respectively. Thus, the spring 43 acts to normally urge the locking plate 41 in the locking direction of the tongue plate device 1, and at the same time, to normally urge the push portion 42C of the push rod 42 in such a direction that the push portion 42C protrudes normally beyond one end 45B of the groove 45 of the cover member 44.

The second embodiment of the tongue plate device having a structure as above described operates in a manner similar to that described with reference to the first embodiment. The locking plate 41 is urged by the spring 43 to normally press a webbing 25 against the edge of the opening 8 of the tongue plate 2. Thus, normally, the webbing 25 is locked against passing through the opening 8 of the tongue plate 2, and the tongue plate device 1 is in the locking mode. When the push portion 42C of the push rod 42 is manually urged in the releasing direction, the locking plate 41 is urged in the direction normal to the moving direction of the push rod 42 against the force of the spring 43, and the locking pressure imparted by the locking plate 41 to the webbing 25 in the opening 8 of the tongue plate 2 is released to permit free passage of the webbing 25 though the opening 8 of the tongue plate 2.

This second embodiment can be applied to a seat belt system in entirely the same manner as that described with reference to FIGS. 4 and 5 to which the first embodiment is applied.

Figure 10:
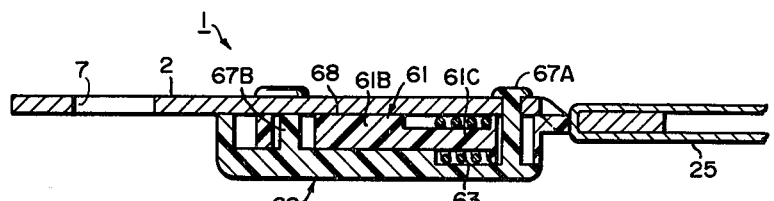
FIG. 10 is a sectional view taken along the line X — X in FIG. 9.
Figure 11:
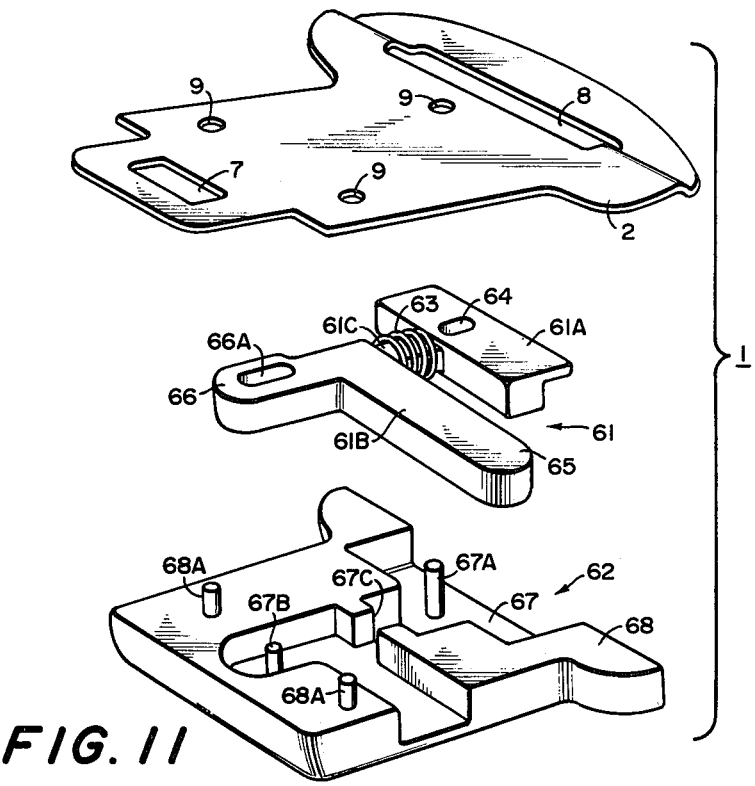
FIG. 11 is an exploded perspective view of the device shown in FIG. 9.

A third embodiment of the present invention will be described with reference to FIGS. 9 to 11.

The tongue plate device 1 embodying the third form of the present invention comprises a tongue plate 2 of shape and material similar to those of the tongue plate 2 employed in the first embodiment, a locking plate 61 adapted to move in the same direction as that of the locking plate 3 employed in the first embodiment, a cover member 62 securely fixed to the tongue plate 2 to hold the locking plate 61 between it and the tongue plate 2, and a compression spring 63 interposed between the cover member 62 and the locking plate 61 to normally urge the locking plate 61 in a locking direction.

The locking plate 61 is integrally moulded from a suitable resin material and comprises a locking portion 61A, a lever portion 61B, and a neck portion 61C interconnecting these portions 61A and 61B. The locking portion 61A of the locking plate 61 is in the form of a block of substantially L-like cross section and is formed at the middle portion thereof with a slot 64 extending in the moving direction thereof. One end of the neck portion 61C is connected to the side of locking portion 61A adjacent to the slot 64.

Figure 9:
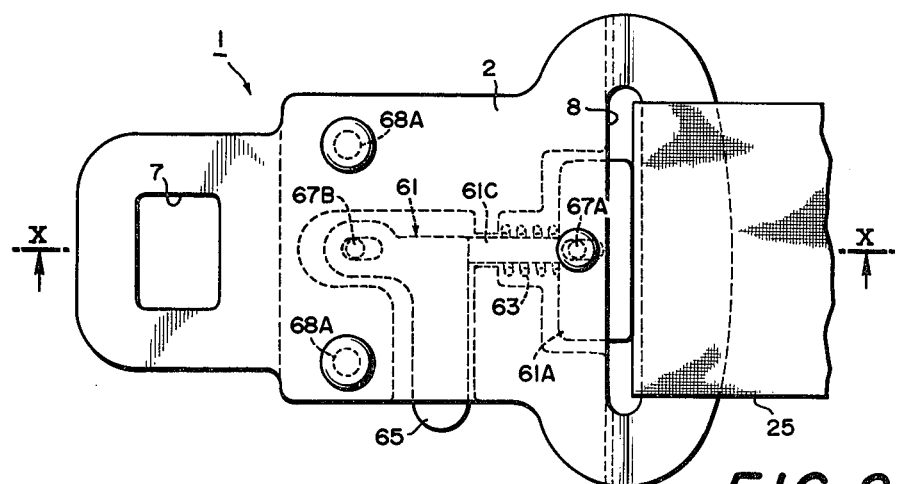
FIG. 9 is a front elevation of a third embodiment of the present invention.

The lever portion 61B of the locking plate 61 is in the form of a substantially L-shaped bar, and one end 65 of this lever portion 61B extends normal to the moving direction of the locking plate 61 to protrude beyond one side of the cover member 62 as seen in FIG. 9. The other end 66 of the lever portion 61B extends in the moving direction of the locking plate 61 and is formed with a slot 66A extending in the longitudinal direction thereof. The other end of the neck portion 61C is connected to the side of the lever portion 61B adjacent to the bend of the L.

The cover member 62 is integrally moulded from a suitable resin material and is formed in the middle of one surface thereof with a recess 67 in which the locking plate 61 is received to make sliding movement. A pair of spaced pins 67A and 67B project from this recess 67 to be inserted into the respective slots 64 and 66A of the locking plate 61 for guiding the sliding movement of the locking plate 61.

A pair of spaced pins 68A project from a raised surface portion 68 of the cover member 62 to be inserted together with the pin 67A into corresponding apertures 9 bored in the tongue plate 2. After being inserted, these pins 68A and 67A are caulked at the head portion thereof to firmly fix the cover member 62 to the tongue plate 2. The recess 67 includes a central narrowed portion 67C, and the compression spring 63 is mounted on the neck portion 61C of the locking plate 62 and is interposed between this narrowed portion 67C and the locking portion 61A of the locking plate 61 for normally urging the locking plate 61 in the locking direction.

In operation, the locking plate 61 is normally urged in the locking direction by the compression spring 63 to lock a webbing 25 in the opening 8 of the tongue plate 2 against passing movement by pressing the webbing 25 by the locking portion 61A against the edge of the opening 8 of the tongue plate 2. When the end 65 of the lever portion 61B of the locking plate 61 is manually urged in the releasing direction, the locking plate 61 is urged away from the opening 8 of the tongue plate 2 against the force of the spring 63. Thus, the locking pressure imparted to the webbing 25 by the locking portion 61A of the locking plate 61 is released, and the webbing 25 can now freely pass through the opening 8 of the tongue plate 2.

This third embodiment is advantageous over the first and second embodiments in that the number of parts is less than the latter due to the fact that the locking plate has the additional function of serving as the release levers or push rod.

This third embodiment can also be applied to a seat belt system in entirely the same manner as that described with reference to FIGS. 4 and 5 to which the first embodiment is applied.

The tongue plate device according to the present invention is in no way limited to the forms described hereinbefore, and various changes and modifications may be made therein inasmuch as the webbing passing through the webbing passing opening of the tongue plate can be releasably locked against passing movement.

It is apparent further that the material of the springs employed in the individual embodiments is in no way limited to a metal and may be any other suitable resilient one such as a resin or rubber.

It will be understood from the foregoing detailed description that the present invention provides a tongue plate device for use in a seat belt system of the kind using a continuous webbing consisting of a lap belt and a shoulder belt for restraining an occupant to a seat of a vehicle, comprising a tongue plate having a buckle engaging portion at one end thereof and a webbing passage portion at the other end thereof, a locking plate engaging said webbing at said webbing passage portion of said tongue plate for locking said webbing against passing movement, resilient means for normally urging said locking plate in the locking direction, and releasing means for urging said locking plate in the releasing direction thereby unlocking said webbing from the state engaged and locked by said locking plate. The tongue plate device of the present invention having the features above described is advantageous in that the length of the seat belt can be easily adjusted by simple manipulation by the wearer, and the sense of oppression imparted to the wearer by the belt retracting force can be entirely eliminated. The present invention is further advantageous in that the seat belt system using the tongue plate device provides improved wearability and ensures increased safety to the occupant wearing the seat belt on his body.

We claim:

1. A tongue plate device for use in a three-point seat belt system of the kind using a continuous webbing consisting of a lap belt and a shoulder belt for restraining an occupant onto a seat of a vehicle, comprising a tongue plate having a buckle engaging portion at one end thereof and a webbing passage portion at the other end thereof, a locking plate engaging said webbing at said webbing passage portion of said tongue plate for locking said webbing against passing movement, resilient means for normally urging said locking plate in the locking direction, and releasing means for urging said locking plate in the releasing direction so as to unlock said webbing from said locking plate, said releasing means being operatively connected to said locking plate by cam means and having an edge protector provided in said webbing passage and coupled to said tongue plate, wherein said releasing means comprises a push rod which acts to move said locking plate in a direction normal to the moving direction thereof through said cam means, and said resilient means comprises a torsion coil spring which is mounted on a pin fixed to said tongue plate and is anchored to said locking plate and said push rod at the respective ends thereof.

2. A tongue plate device as claimed in claim 1 wherein said tongue plate is a thin plate of metal formed at one end thereof with an opening engaged by said buckle and at the other end thereof with another opening permitting passage of said webbing therethrough.

3. A tongue plate device for use in a three-point seat belt system of the kind using a continuous webbing consisting of a lap belt and a shoulder belt for restraining an occupant onto a seat of a vehicle, comprising a tongue plate having a buckle engaging portion at one end thereof and a webbing passage portion at the other end thereof, a locking plate engaging said webbing at said webbing passage portion of said tongue plate for locking said webbing against passing movement, resilient means for normally urging said locking plate in the locking direction, and a push rod for urging said locking plate in the releasing direction thereby unlocking said webbing from the state engaged and locked by said locking plate, said push rod being coupled to said locking plate by a pin member such that moving said push rod causes said locking plate to move in a direction normal thereto.

4. A tongue plate device as claimed in claim 3, wherein said tongue plate is a thin plate of metal formed at one end thereof with an opening engaged by said buckle and at the other end thereof with another opening permitting passage of said webbing therethrough.

5. A tongue plate device as claimed in claim 3 wherein said resilient means comprises a torsion coil spring which is mounted on a pin fixed to said tongue plate and is anchored to said locking plate and said push rod at the respective ends thereof.

6. A tongue plate device according to claim 3 wherein said locking plate has a generally T-shaped configuration.

7. A tongue plate device according to claim 3 wherein a cover member is coupled to said tongue plate, said push rod being slidably disposed in a groove in said cover member.

8. A tongue plate device according to claim 3 wherein said cover member includes pin members for engaging and aligning said locking plate and said tongue plate.

* * * * *